M. H. ZIRKLE.
CHECK ROW CORN PLANTER.
APPLICATION FILED SEPT. 8, 1913.
1,100,465.
Patented June 16, 1914.
2 SHEETS—SHEET 1.
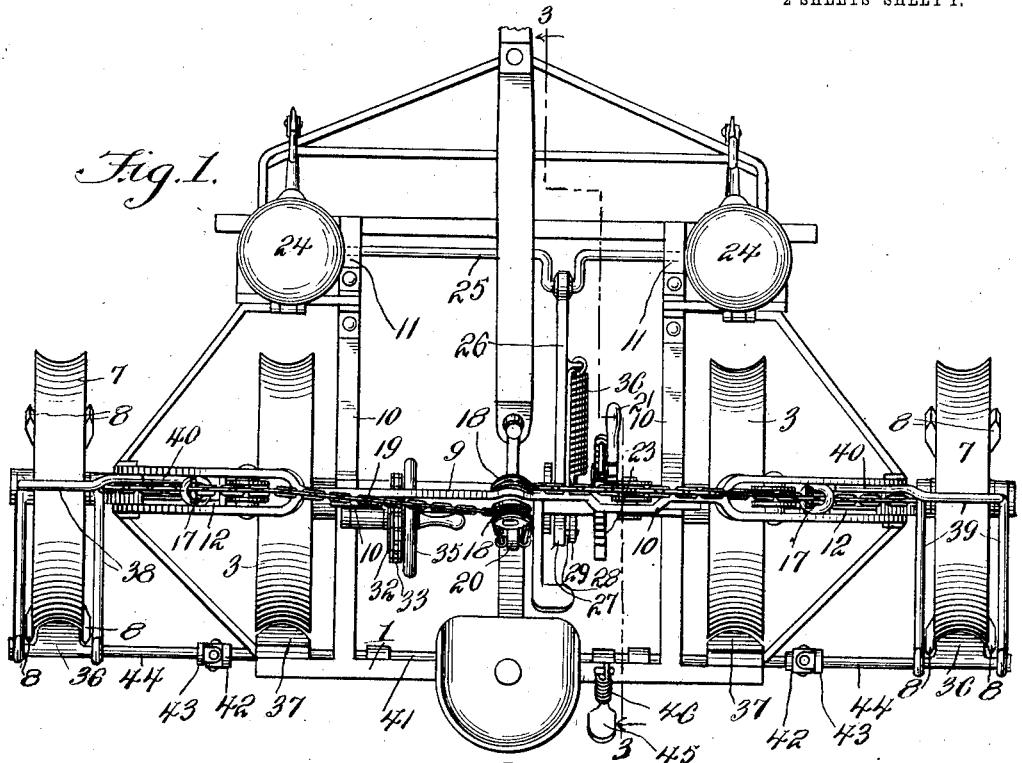
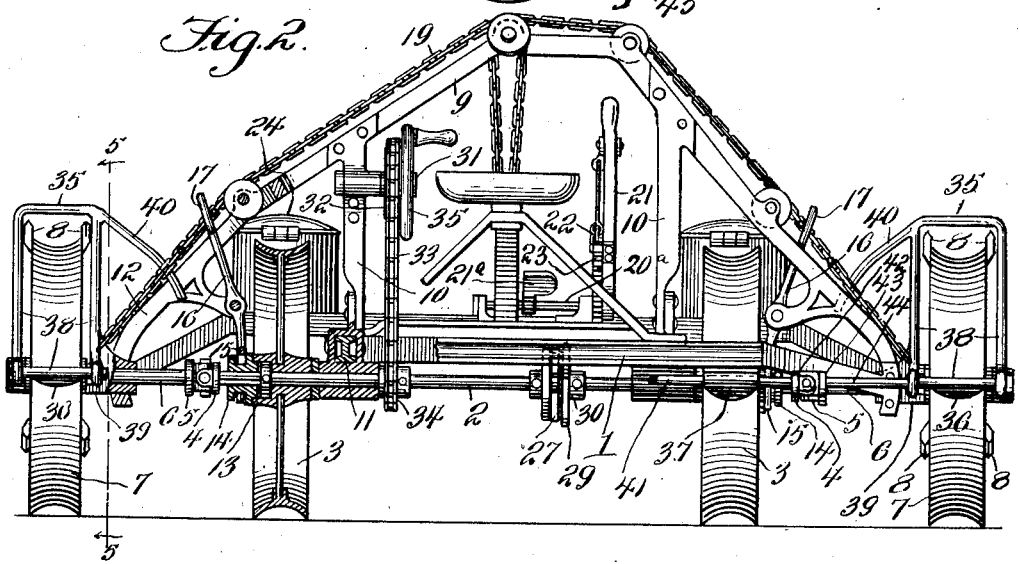
WITNESSES:
INVENTOR:
Mark H. Zirkle
Attorney.

M. H. ZIRKLE.
CHECK ROW CORN PLANTER.
APPLICATION FILED SEPT. 8, 1913.
1,100,465.
Patented June 16, 1914.
2 SHEETS—SHEET 2.
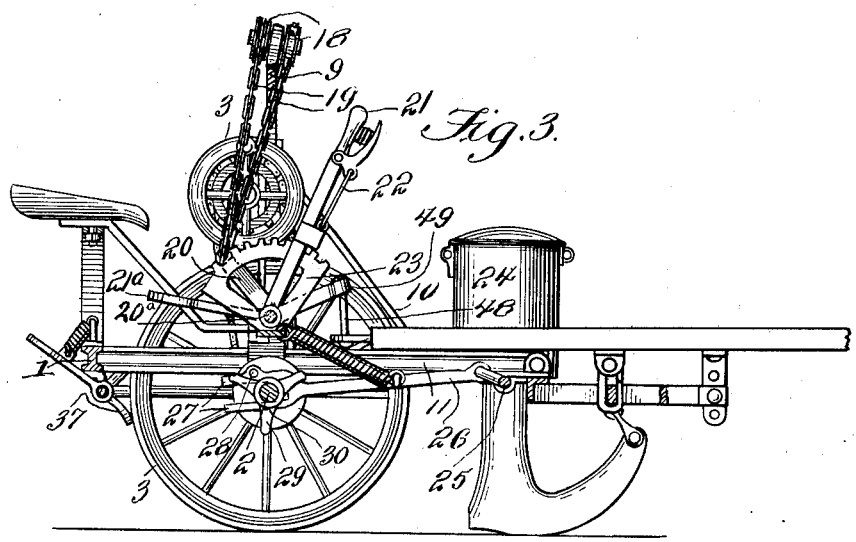
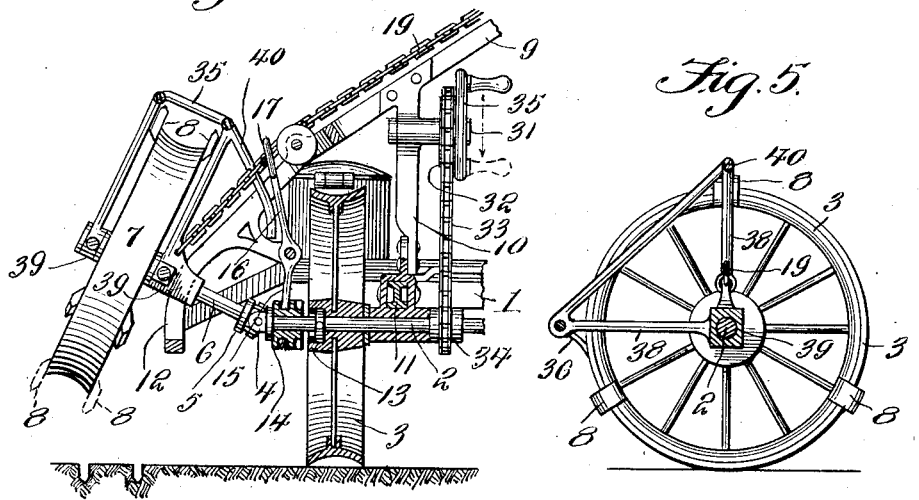
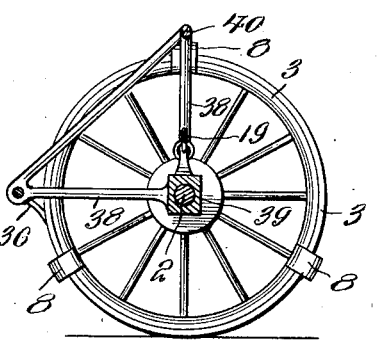
WITNESSES:
INVENTOR:
Mark H Zirkle

UNITED STATES PATENT OFFICE.

MARK H. ZIRKLE, OF COOKSVILLE, ILLINOIS.

CHECK-ROW CORN-PLANTER.

1,100,465.  Specification of Letters Patent.  Patented June 16, 1914.

Application filed September 8, 1913. Serial No. 788,571.

*To all whom it may concern:*

Be it known that I, MARK H. ZIRKLE, a citizen of the United States, residing at Cooksville, in the county of McLean and State of Illinois, have invented certain new and useful Improvements in Check-Row Corn-Planters, of which the following is a specification.

This invention relates to check row corn planters; and it has for its object means for sowing the seed in check rows with facility and without the aid of the well known check line; further, the provision of markers for accurately indicating the hills to insure the proper transverse alinement of the rows, and means for instantaneously rendering the seed dropping mechanism inoperative at the ends of the rows.

Another object of the invention is to provide means for facilitating the operation of raising the spacing or gage wheels and for causing the same to be instantaneously thrown out of operation when turning the machine at the ends of the rows.

Another object of the invention is to provide resetting mechanism which may be manually controlled after the turning of the machine and which will effect operative adjustments of the gage wheels, so as to cause the gage wheels to travel in the proper previously formed path.

With these and other objects in view, the invention consists of certain novel features of construction, combination and arrangement of parts, as will be hereinafter described and claimed.

In the accompanying drawings:—Figure 1 is a top plan view of the machine; Fig. 2 is a rear end view thereof with parts in section; Fig. 3 is a longitudinal section therethrough; Fig. 4 is a view similar to Fig. 2 of a portion of the machine, showing the gage wheel adjusted to an inoperative position; and Fig. 5 is a section through one of the stub axles, showing the gage wheel thereon and illustrating the association therewith of the scrapers.

The machine comprises a portable frame 1, which is mounted upon an axle 2 whereon ground wheels 3 are adapted to freely revolve. The axle has its ends extended beyond the outer ends of the hubs of the wheels 3 and provided with knuckle joints 4, which are connected with similar joints 5 and with vertically adjustable stub axles 6, the latter being provided with marking wheels 7, which are provided with spades or marking devices 8 which radiate from the peripheral surface of the wheels and which are arranged equidistally thereon, as shown in Fig. 4. These wheels are so constructed and the marking spades thereof arranged thereon that one wheel is compelled to travel in the track formed by the other wheel after the turning, and thereby designate where the operator must start in order to properly check the seed, it being understood that one of the spades of one of the wheels is to be advanced into the last hole of the previously formed row after the machine is turned at the end of the row, in order that the proper alinement of the rows may be made.

The frame 1 preferably includes a vertical arch bar 9, braces 10 between the side branches of the arch bar and the longitudinal bars 11 of the frame 1. The side branches of the arch bar are provided with lower portions which terminate in line with the axle 2 and which are slotted at 12, so as to accommodate the stub axles for vertical adjustments. The supporting wheels 3 of the main axle 2 are provided with clutch elements 13, which are adapted for interlocking engagement with companion clutch elements 14, which are keyed for sliding adjustments on the extremities of the axle whereby when both elements are thrown into interlocking engagement with each other the axle 2 will be rendered operative for the effective distribution or dropping of the seed. The sliding clutch elements 14 are operatively associated with the arms 15 of rocking levers 16. These levers are pivotally supported upon the frame structure 1 of the machine and they are provided with outwardly extending arms 17 which pass through the slots 12 in the lower ends of the side branches of the arch bar 9.

The arch bar is provided at its upper end with a double pulley 18 which receives the companion chains 19. These chains are extended from the stub axles of the gage or marking wheels 7 to a crank arm 20 fixed to a rock shaft 20ª, to which is also fixed a hand lever 21. This lever is provided with a locking pawl 22, which is adapted to engage in a fixed rack element 23 on the frame 1, whereby the lever, the shaft 20ª and the parts associated therewith, may be held in any required adjusted position. From this construction, it is evident that when the controlling portion of the lever 21 is moved in a rearward direction, pull will be applied to the chains 19, whereby the stub axles may be tilted vertically and moved to inoperative positions above the surface of the ground. A foot-actuated treadle 21ª is also employed for rocking the shaft, whereby either hand or foot power or both, may be used when occasion requires. The shaft 20ª is connected, as hereinafter described, with the draft pole of the implement, so that the planter may be elevated simultaneously with the stub axles. When the axle 20ª is rocked rearwardly by the action of the lever 21 or treadle 21ª, the axle 2 is rendered inoperative for distribution of the seed as follows:— The extensions 17 of the rocking lever 16 are extended through adjacent links of the lifting chains 19, so that when the chains are drawn upwardly through the previously described operation of the controlling end of the lever 21, the lever 16 will be rocked, and as a consequence the keyed clutch elements 14 will be automatically thrown out of engagement with the elements 13 of the supporting wheels 3.

The frame 1 supports seed boxes 24, which may be of any suitable well known construction, and which may be connected operatively with a seed dropping shaft 25, the latter being connected by transmitting mechanism which includes a reciprocating rod 26 having a bifurcated rear end 27, which is associated with the axle 2 and provided with a radial pin 28, which is adapted to be successively engaged by the arms 29 of a tappet wheel 30 on said axle 2. It is now seen that when the sliding clutch elements hereinbefore described are released from the clutch elements of the supporting wheels 3, the seed distributing mechanism will be instantaneously rendered inoperative.

It frequently happens that the axle must be operated after turning at the ends of the rows in order that the gage wheels may be made to follow in the previously cut track and in view thereof I preferably provide manually operated mechanism which comprises a shaft 31 which is journaled in one of the vertical standards 2 and which is provided with a sprocket gear wheel 32, which is connected through the medium of a power transmitting chain 33 with a similar sprocket gear wheel 34 on the axle 2. The crank wheel 35 on the shaft 31 may be revolved so that the axle 2 may be turned the required distance so as to bring the cutting spades of the gage wheels into proper position to follow the previously cut track. The rod 26 of the seed dropping mechanism is connected with the frame 1 of the machine by means of a return spring 36 which will operate to move the rod 26 to its initial position after each dropping of the seed.

Scrapers are included in the construction of the machine and are adapted to scrape the peripheral surface of the gage wheels while the machine is traveling over the field. Said scrapers may include upper scraping elements 35 which lie above the axis of the gage wheels and rear scraping elements 36. The frame 1 also includes scraping elements 37 which operate against the supporting wheels 3, as shown. The frames 38 which support the scraping elements 35 and 36 are provided with bearing portions 39, which are mounted upon the stub axles and they are further provided with arms 40 which extend into the slots 12, so as to be confined against the opposite side walls thereof to prevent the scraper frame and the stub axle from moving horizontally with relation to the main axle 2. The scrapers 37 are carried by a rocking shaft 41 in the frame 1 and as illustrated said shaft is provided with connecting elements 42, connected with similar elements 43 on the extensions 44 of the frames 38. The shaft 41 carries a foot treadle 45 which may be controlled by the driver, so that the scrapers may be moved into effective scraping positions against the action of a return spring 46.

The draft pole 47 of the machine may be connected through the link 48 with the arm 49 of the shaft 20ª which supports the treadle 21ª and the lever 21 so that the described lift of the planter can be made when the shaft is rocked.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim is:—

1. In a corn planter, a portable frame having a main axle, and stub axles, means connecting the stub axles for vertical movements on said main axle, gage wheels mounted on said stub axles, supporting wheels loose upon the main axle, means for tilting the stub axles, and means operable through tilting movements of the stub axles for rendering the supporting wheels operatively fixed and released respectively with relation to the stub axles.

2. In a corn planter, a portable frame having a main axle, seed distributing mechanism operated thereby, supporting wheels loose upon the main axle, stub axles mounted for vertical tilting movements upon the main axle, gage wheels fixed to said stub axles, clutch elements fixed to the supporting wheels, clutch elements keyed for sliding movements upon said main axle, means for tilting the stub axles, and means operated by the tilting means for effecting adjustments of the keyed clutch elements relatively of the clutch elements of the supporting wheels and operable to render the seed dropping mechanism inoperative when the stub axles are tilted to raise the gage wheels from working positions.

3. In a corn planter, a portable frame having a main axle, supporting wheels loose thereon tilting stub axles carried by the main axle, fixed gage wheels on the stub axles, means for rendering the supporting wheels fixed upon the main axle when the stub axles are adjusted to operatively advance the gage wheels against the ground and to render the supporting wheels movable on the main axle when the gage wheels are in inoperative positions, and means for holding the gage wheels against swinging laterally during their vertical tilting movements.

4. A planter comprising a portable frame having a main axle, and stub axles, means for connecting the stub axles for vertical movements on said main axle, gage wheels mounted on the stub axles and provided with radial spades, supporting wheels loose upon the main axle, an arch bar carried by the frame and slidably receiving the stub axles, and tilting mechanism for moving the stub axles in their receiving portions of said arch bar.

5. A planter comprising a portable frame having a main axle, seed distributing mechanism operated through the axle, supporting wheels loose upon the axle, stub axles connected for tilting movement on the main axle, clutch elements fixed to the supporting wheels, clutch elements slidably mounted on the main axle and rotating therewith, an arch bar, flexible means traveling over the arch bar and connected with the stub axles, means for operating the flexible means to effect adjustments of the stub axles, and means operated by the flexible means for moving the sliding clutch elements with relation to the clutch elements of the supporting wheels, on movements of the axles.

6. A planter comprising a portable frame having a main axle, seed distributing mechanism operated through the axle, supporting wheels loose upon the axle, stub axles connected for tilting movement on the main axle, clutch elements fixed to the supporting wheels, clutch elements slidably mounted on the main axle and rotating therewith, an arch bar, flexible means traveling over the arch bar and connected with the stub axles, means for operating the flexible means to effect adjustment of the stub axles, and means operated by the flexible means for moving the sliding clutch elements with relation to the clutch elements of the supporting wheels, on movements of the axles and including rocking levers supported by the frame and connected with the sliding clutch elements and having arms operatively associated with said flexible means.

7. A planter comprising a portable frame including a main axle having supporting wheels mounted to revolve thereon and including fixed clutch elements, sliding clutch elements keyed to the axle, an arch bar carried by the frame, stub axles mounted for tilting movements in the arch bar and operatively connected with the main axle, flexible means traveling over the arch bar and connected with the stub axles, controlling mechanism for said means, and means operated by the flexible means for rendering the sliding clutch elements inoperative with relation to the clutch elements of the supporting wheels.

8. A planter comprising a portable frame including a main axle having supporting wheels mounted to revolve thereon and including fixed clutch elements, sliding clutch elements keyed to the axle, an arch bar carried by the frame, stub axles mounted for tilting movements in the arch bar and operatively connected with the main axle, flexible means traveling over the arch bar and connected with the stub axles, controlling mechanism for said means, and means operated by the flexible means for rendering the sliding clutch elements inoperative with relation to the clutch elements of the supporting wheels, the arch bar having terminal slots for accommodating movements of the stub axles, scraper frames journaled upon the stub axles, and means on the scraper frames extending into the slots of the arch bar whereby to hold the frame against horizontal tilting movements when the stub axles are moved vertically.

9. A planter comprising a portable frame having a main axle, and stub axles, means for connecting the stub axles for vertical movements on said main axle, gage wheels mounted on the stub axles and provided with radial spades, supporting wheels loose upon the main axle, an arch bar carried by the frame and slidably receiving the stub axles, and tilting mechanism for moving the stub axles in their receiving portions of said arch bar, seed distributing mechanism operated by the main axle, and re-setting mechanism for turning the main axle.

In testimony whereof I affix my signature in presence of two witnesses.

MARK H. ZIRKLE.

Witnesses:
W. R. CLICKENER,
WALKER R. FLINT.

Copies of this patent may be obtained for five cents each, by addressing the "Commissioner of Patents, Washington, D. C."